United States Patent [19]

Iwanami et al.

[11] Patent Number: 5,621,046
[45] Date of Patent: Apr. 15, 1997

[54] POLYPROPYLENE RESIN COMPOSITION

[75] Inventors: Kunio Iwanami; Masatoshi Ohkura; Satoshi Ueki; Shigeyuki Toki, all of Tokyo; Takeyoshi Nishio, Okazaki; Takao Nomura, Toyota, all of Japan

[73] Assignees: Tonen Chemical Corporation, Tokyo; Toyota Jidosha Kabushiki Kaisha, Aichi-ken, both of Japan

[21] Appl. No.: 499,908

[22] Filed: Jul. 11, 1995

[30] Foreign Application Priority Data

| Jul. 11, 1994 | [JP] | Japan | 6-181898 |
| Jul. 11, 1994 | [JP] | Japan | 6-181899 |
| Jul. 11, 1994 | [JP] | Japan | 6-181904 |

[51] Int. Cl.$^6$ ............................................. C08L 23/00
[52] U.S. Cl. ................................ 525/240; 526/126
[58] Field of Search ........................ 525/240; 526/124

[56] References Cited

U.S. PATENT DOCUMENTS

| 4,871,805 | 10/1989 | Shimomura | 525/98 |
| 5,093,415 | 3/1992 | Brady | 525/53 |
| 5,164,352 | 11/1992 | Job | 502/124 |
| 5,231,144 | 7/1993 | Yamamoto | 525/333.8 |
| 5,241,014 | 8/1993 | Kehr | 525/376 |
| 5,294,581 | 3/1994 | Job | 502/124 |
| 5,330,949 | 7/1994 | Funabashi | 502/111 |
| 5,412,020 | 5/1995 | Yamamoto | 524/504 |

*Primary Examiner*—Irina S. Zemel
*Attorney, Agent, or Firm*—Sughrue, Mion, Zinn, Macpeak & Seas

[57] ABSTRACT

A polypropylene resin composition including (A) 50–90 parts by weight of a polypropylene resin including (a) 3–30 weight % of stereoblock polypropylene having a weight-average molecular weight of 5,000–1,000,000, a percentage of five continuous propylene monomer units in which all propylene bonds are meso bonds and a percentage of five continuous propylene monomer units in which all propylene bonds are racemic bonds being 70% or more and 5% or more, respectively relative to the all propylene bonds, and (b) 70–97 weight % of an ultra-high stereospecific polypropylene having a melt flow rate of 0.1–1,000 g/10 minutes, an average meso chain length Nm calculated from a triad percentage determined from $^{13}$C-NMR spectrum by the following formula of Nm=2[mm]/[mr]+1, wherein [mm] is (isotactic triad/total triad)×100 (%) and [mr] is (heterotactic triad/total triad)×100 (%), meeting a relation of Nm>250+ 29.5 log (MFR), and (B) 50–10 parts by weight of an olefinic rubber and/or a polyolefin other than (A).

3 Claims, No Drawings

POLYPROPYLENE RESIN COMPOSITION

BACKGROUND OF THE INVENTION

The present invention relates to a polypropylene resin composition having excellent impact strength and stiffness for interior and exterior parts of automobiles, parts of home electric appliances and other industrial parts.

Since polypropylene resins are light and have excellent mechanical strength, they are used in various applications. However, their impact strength and heat resistance are in an antinomic relation; for instance, if the amount of an olefinic rubber is increased to improve impact strength in resin compositions for automobile bumpers, the resin compositions would have a flexural modulus lowered to about $15 \times 10^3$ kgf/cm$^2$ and a thermal deformation temperature lowered to about 120° C. Accordingly, to maintain the strength of parts, their designs and the baking temperatures of coatings are limited. Conversely, if large amounts of inorganic fillers are added to improve stiffness and heat resistance, the impact strength of the resin compositions would drastically be reduced.

Accordingly, if such antinomy can be overcome, polypropylene resin materials would find wide varieties of applications, and increased varieties of parts would be able to be produced from one type of polypropylene material, leading to advantages in production cost.

OBJECT AND SUMMARY OF THE INVENTION

Accordingly, an object of the present invention is to provide a polypropylene resin composition having well balanced impact strength, stiffness and heat resistance.

As a result of intense research in view of the above objects, the inventors have found that by mixing a blend of a stereoblock polypropylene whose main chain is constituted by isotactic chains and syndiotactic chains bonded together alternately (hereinafter referred to as "SBPP") and/or an ultra-high stereospecific polypropylene with an olefinic rubber and/or polyolefin other than the above polypropylene and inorganic fillers, the resulting polypropylene resin composition shows improved impact strength, stiffness and heat resistance.

Thus, the first polypropylene resin composition of the present invention comprises;
(A) 50–90 parts by weight of an ultra-high stereospecific polypropylene having a melt flow rate (MFR, 230° C., 2.16 kg load) of 0.1–1,000 g/10 minutes in which an average meso chain length Nm calculated from a triad percentage determined from $^{13}$C-NMR spectrum by the following formula (1):

$$Nm=2[mm]/[mr]+1 \qquad (1),$$

wherein
[mm] is (isotactic triad/total triad)×100 (%), and [mr] is (heterotactic triad/total triad)×100 (%),
meets a relation expressed by the following formula (2):

$$Nm>250+29.5 \log (MFR) \qquad (2),$$

(B) 50–10 parts by weight of an olefinic rubber and/or a polyolefin other than (A); and
(C) 0–40 parts by weight of an inorganic filler per 100 parts by weight of (A)+(B).

The second polypropylene resin composition of the present invention comprises;
(A) 50–90 parts by weight of a polypropylene resin, 3–30 weight % of which is polypropylene insoluble in hot heptane and soluble in hot octane and having a weight-average molecular weight of 5,000–1,000,000, a percentage of five continuous propylene monomer units in which all propylene bonds are meso bonds and a percentage of five continuous propylene monomer units in which all propylene bonds are racemic bonds, both determined from pentad percentages in $^{13}$C-NMR spectrum, being 70% or more and 5% or more, respectively relative to the all propylene bonds,
(B) 50–10 parts by weight of an olefinic rubber and/or a polyolefin other than (A); and
(C) 0–40 parts by weight of an inorganic filler per 100 parts by weight of (A)+(B).

The third polypropylene resin composition of the present invention comprises;
(A) 50–90 parts by weight of a polypropylene resin comprising;
 (a) 3–30 weight % of polypropylene insoluble in hot heptane and soluble in hot octane and having a weight-average molecular weight of 5,000–1,000,000, a percentage of five continuous propylene monomer units in which all propylene bonds are meso bonds and a percentage of five continuous propylene monomer units in which all propylene bonds are racemic bonds, both determined from pentad percentages in $^{13}$C-NMR spectrum, being 70% or more and 5% or more, respectively relative to the all propylene bonds, and
 (b) 70–97 weight % of an ultra-high stereospecific polypropylene having a melt flow rate (MFR, 230° C., 2.16 kg load) of 0.1–1,000 g/10 minutes in which an average meso chain length Nm calculated from a triad percentage determined from $^{13}$C-NMR spectrum by the following formula (1):

$$Nm=2[mm]/[mr]+1 \qquad (1),$$

wherein
[mm] is (isotactic triad/total triad)×100 (%), and [mr] is (heterotactic triad/total triad)×100 (%),
meets a relation expressed by the following formula (2):

$$Nm>250+29.5 \log (MFR) \qquad (2),$$

(B) 50–10 parts by weight of an olefinic rubber and/or a polyolefin other than (A); and
(C) 0–40 parts by weight of an inorganic filler per 100 parts by weight of (A)+(B).

DETAILED DESCRIPTION OF THE INVENTION

The first polypropylene resin composition comprises
(A) ultra-high stereospecific polypropylene,
(B) an olefinic rubber and/or a polyolefin other than (A), and
(C) an inorganic filler as an optional component.
The second polypropylene resin composition comprises
(A) a polypropylene resin, at least part of which is stereoblock polypropylene, (B) an olefinic rubber and/or a polyolefin other than (A), and (C) an inorganic filler as an optional component.

The third polypropylene resin composition comprises (A) a polypropylene resin comprising
   (a) stereoblock polypropylene, and
   (b) ultra-high stereospecific polypropylene, (B) an olefinic rubber and/or a polyolefin other than (A), and (C) an inorganic filler as an optional component.

The details of the above first to third polypropylene resin compositions will be described in detail below. It should be noted that the detailed descriptions of each component are applicable to each of the first to third polypropylene resin compositions.

[1] Components
[A] Polypropylene resin

The polypropylene resin comprises stereoblock polypropylene and/or ultra-high stereospecific polypropylene. In the case of stereoblock polypropylene, the polypropylene resin may contain conventional polypropylene (not categorized into stereoblock polypropylene and ultra-high stereospecific polypropylene).

(a) Stereoblock polypropylene (SBPP)
(I) Production method

SBPP may be obtained by an extraction treatment with hot heptane and hot octane of polypropylene polymerized from propylene at 60° C. or lower in the presence of a catalyst described below.

(1) Catalyst

The catalyst used for the production of polypropylene comprises three components (i), (ii) and (iii).

(i) Solid catalyst components comprising as indispensable components magnesium, titanium, halogen and an electron donor, which can be obtained by contacting magnesium compounds, titanium compounds and electron donors, and further halogen-containing compounds if halogen is not contained in any of the above three compounds, (ii) Organoaluminum compound, and (iii) Organosilicon compound represented by the general formula:

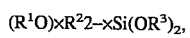

wherein x is 0, 1 or 2, $R^1$ is a hydrocarbon group having 2–10 carbon atoms, $R^2$ is a hydrocarbon group having 1–10 carbon atoms, $R^3$ is a hydrocarbon group having 2–4 carbon atoms, and $R^1$, $R^2$ and $R^3$ may be the same or different.).

A ratio of the component (ii) to the component (i) is such that the component (ii) is 1–2,000 mole, preferably 20–500 mole per 1 gram atom of titanium in the component (i). Also, a ratio of the component (iii) to the component (ii) is such that the component (iii) is 0.001–10 mole, preferably 0.01–1.0 mole per 1 mole of the component (ii).

(2) Polymerization conditions

The polymerization reaction of propylene may be conducted both in a gas phase and in a liquid phase. The liquid-phase polymerization may be carried out in an inert hydrocarbon solvent such as n-butane, iso-butane, n-pentane, iso-pentane, hexane, heptane, octane, cyclohexane, benzene, toluene, xylene, etc. or in liquid monomers. The polymerization temperature is preferably 0°–60° C., and the polymerization pressure is preferably 1–60 atm. The molecular weight of the resulting polypropylene can be controlled by hydrogen or known other molecular weight modifiers. The polymerization may be carried out by a continuous reaction or a batch reaction under conventional conditions. The polymerization reaction may be carried out by a single step or by multiple steps.

(3) Extraction treatment

The resultant polypropylene is extracted with hot heptane to recover an insoluble component, which is then extracted with hot octane to recover a hot octane-soluble polypropylene component. The polypropylene component thus obtained is SBPP. The terms "hot heptane" and "hot octane" used herein mean boiling heptane and boiling octane, respectively. Also, the hot heptane-soluble component is insufficient in crystallinity, and the hot heptane-insoluble, hot octane-insoluble component is poor in improvement of impact strength.

(II) Properties

The stereospecificity of SBPP is measured by a $^{13}$C-NMR method described in Macromolecules, 6, 925 (1973). Determined from the $^{13}$C-NMR method is a pentad percentage showing a bonding state in a set of five continuous propylene monomer units, from which percentages of meso bond and racemic bond are obtained with respect to a propylene monomer unit located at a center in each set of the five continuous propylene monomer units. The assignment of peaks is made according to a method described in Macromolecules, 6, 687 (1975). Specifically, the intensities of an mmmm peak and an rrrr peak are measured in the $^{13}$C-NMR spectrum, and their percentages are calculated relative to all absorption peaks in a methyl hydrocarbon region. A percentage in intensity of the mmmm peak is represented by [mmmm] (meso bond), and a percentage in intensity of the rrrr peak is represented by [rrrr] (racemic bond).

The SBPP used in the present invention has 70% or more of a meso bond percentage and 5% or more of a racemic bond percentage. When the meso bond percentage is less than 70%, the SBPP has an insufficient crystallinity. When the racemic bond percentage is less than 5%, a resin composition containing such SBPP is insufficiently improved in impact strength. The preferred meso bond percentage is 70–80%, and the preferred racemic bond percentage is 5–10%.

The SBPP used in the present invention has a weight-average molecular weight of 5,000–1,000,000. When the weight-average molecular weight of the SBPP is less than 5,000, a resin composition containing such SBPP is insufficiently improved in impact strength. On the other hand, when the weight-average molecular weight of the SBPP exceeds 1,000,000, the resin composition containing such SBPP shows insufficient flowability. The preferred weight-average molecular weight of the SBPP is 100,000–500,000.

(b) Ultra-high stereospecific polypropylene
(I) Production method

The ultra-high stereospecific polypropylene (HSPP) may be obtained by an extraction treatment with hot heptane of polypropylene polymerized from propylene at 60° C. or lower in the presence of a catalyst described below.

(1) Catalyst

The catalyst used for the production of the ultra-high stereospecific polypropylene comprises three components (i), (ii) and (iii).

(i) Solid catalyst components comprising as indispensable components magnesium, titanium, halogen and an electron donor, which are brought into contact with propylene in the presence of trialkyl aluminum and an organosilicon compound;

(ii) Organoaluminum compound; and (iii) Organosilicon compound represented by the general formula:

$(R^1O)R^2Si(OCH_3)_2$, wherein $R^1$ is a hydrocarbon group having 1–10 carbon atoms, and $R^2$ is a hydrocarbon group with 2–10 carbon atoms having secondary or tertiary carbons including cyclic hydrocarbon groups.

A ratio of the component (ii) to the component (i) is such that the component (ii) is 1–2,000 mole, preferably 20–500 mole per 1 gram atom of titanium in the component (i). Also, a ratio of the component (iii) to the component (ii) is such that the component (iii) is 0.001–10 mole, preferably 0.01–1.0 mole per 1 mole of the component (ii).

(2) Polymerization conditions

The polymerization reaction of propylene may be conducted both in a gas phase and in a liquid phase. The liquid-phase polymerization may be carried out in an inert hydrocarbon solvent such as n-butane, iso-butane, n-pentane, iso-pentane, hexane, heptane, octane, cyclohexane, benzene, toluene, xylene, etc. or in liquid monomers. The polymerization temperature is preferably 0°–60° C., and the polymerization pressure is preferably 1–60 atm. The molecular weight of the resulting polypropylene can be controlled by hydrogen or known other molecular weight modifiers. The polymerization may be carried out by a continuous reaction or a batch reaction under conventional conditions. The polymerization reaction may be carried out by a single step or by multiple steps.

(3) Extraction treatment

The resultant polypropylene powder is extracted with hot heptane (boiling heptane) for 5 minutes to 1 day, preferably, 30 minutes to 10 hours in an extractor to remove a hot heptane-soluble component.

(II) Properties (1) Melt flow rate (MFR, 230° C., 2.16 kg load)

The ultra-high stereospecific polypropylene thus obtained has a melt flow rate (MFR, 230° C., 2.16 kg load) of 0.1–1,000 g/10 minutes. When the MFR of the ultra-high stereospecific polypropylene is lower than 0.1 g/10 minutes, the ultra-high stereospecific polypropylene shows insufficient flowability. On the other hand, when it exceeds 1,000 g/10 minutes, the ultra-high stereospecific polypropylene has an insufficient impact strength.

(2) Average meso chain length Nm

The average meso chain length Nm of the ultra-high stereospecific polypropylene is calculated from a triad percentage obtained from the $^{13}$C-NMR spectrum by the following formula:

$$Nm=2[mm]/[mr]+1 \qquad (1),$$

wherein [mm] is (isotactic triad/total triad)×100 (%), and [mr] is (heterotactic triad/total triad)×100 (%).

The average meso chain length Nm calculated by the above formula (1) should meet a relation expressed by the following formula:

$$Nm>250+29.5 \log (MFR) \qquad (2).$$

If the above relation (2) is not met, sufficiently high stiffness and impact strength cannot be achieved.

(c) Conventional polypropylene

The polypropylene resin may contain conventional polypropylene which may be homo-polypropylene or propylene block copolymer.

(I) Homo-polypropylene

The homo-polypropylene preferably has a melt flow rate (MFR, 230° C., 2.16 kg load) of 1–100 g/10 minutes.

(II) Propylene block copolymer

The propylene block copolymer contained in the polypropylene resin may be a propylene-ethylene block copolymer having an ethylene content of 1–7 weight %, preferably 2–6 weight %. The propylene-ethylene block copolymer is constituted by (i) a propylene homopolymer portion and (ii) a propylene-ethylene random copolymer portion. These polymer components may exist as separately or in an inseparably combined state. Though each portion of the propylene-ethylene block copolymer consists essentially of propylene and/or ethylene, other α-olefins and dienes, etc. may be contained in small amounts.

(1) Propylene homopolymer portion

The propylene homopolymer portion may be a homopolypropylene portion or a propylene copolymer portion containing such a small amount of ethylene as not deteriorating the crystallinity of the propylene block copolymer. To have a high stiffness, it is preferably a high-crystallinity polypropylene whose residues after 6-hour extraction with boiling hexane are 90 weight % or more, preferably 95 weight % or more. The propylene homopolymer portion preferably has a melt flow rate (MFR, 230° C., 2.16 kg load) of 50–200 g/10 minutes. The percentage of the propylene homopolymer portion to the total block copolymer is preferably 88–98 weight %, more preferably 90–96 weight %.

(2) Propylene-ethylene random copolymer portion

The propylene-ethylene random copolymer portion has an ethylene content of 25–75 weight %, preferably 30–60 weight %. The percentage of the propylene-ethylene random copolymer portion to the total block copolymer is preferably 2–12 weight %, more preferably 4–10 weight %. The weight-average molecular weight of the propylene-ethylene random copolymer portion is preferably $20 \times 10^4$ or more, more preferably $20 \times 10^4$–$80 \times 10^4$.

(3) Production method

The propylene-ethylene block copolymer may be produced by a method in which blocks of propylene and blocks of ethylene are prepared in advance and blended together, or by a method in which propylene and ethylene are copolymerized by a multi-stage process in a single polymerization reaction system. [B] Olefinic rubber and/or polyolefin other than the above polypropylene [A]

(a) Olefinic rubber

The olefinic rubber is a copolymer of ethylene and at least one α-olefin other then ethylene. For instance, an ethylene-propylene rubber (EPR), an ethylene-propylene-diene rubber (EPDM), an ethylene-butene rubber (EBR), etc. may be used as the olefinic rubber.

(I) Types of olefinic rubber (1) Ethylene-propylene rubber (EPR)

The ethylene-propylene rubber (EPR) preferably has an ethylene content of 50–90 mol % and a propylene content of 50–10 mol %. More preferably, the ethylene content is 70–80 mol % and the propylene content is 30–20 mol %. The ethylene-propylene rubber preferably has a melt flow rate (MFR, 230° C., 2.16 kg load) of 0.5–20 g/10 minutes, more preferably 0.5–10 g/10 minutes.

(2) Ethylene-propylene-diene rubber (EPDM)

In the ethylene-propylene-diene rubber (EPDM), the preferred diene monomers are ethylidene norbornene, dicyclopentadiene, 1,4-hexadiene, etc. The diene content is preferably 1–10 mol %. The ethylene-propylene-diene rubber (EPDM) preferably has a melt flow rate (MFR, 230° C., 2.16 kg load) of 0.5–20 g/10 minutes, more preferably 0.5–10 g/10 minutes.

(iii) Ethylene-butene rubber (EBR)

The ethylene-butene rubber (EBR) preferably has an ethylene content of 70–85 mol %, and a butene-1 content of 30–15 mol %. More preferably, the ethylene content is 75–85 mol % and the butene-1 content is 25–15 mol %. The ethylene-butene rubber (EBR) preferably has a melt index (MI, 190° C., 2.16 kg load) of 1–30 g/10 minutes, more preferably 1–20 g/10 minutes.

(II) Properties

The olefinic rubber preferably has a number-average molecular weight of $2\times10^4$–$8\times10^4$, more preferably $3\times10^4$–$6\times10^4$, and a weight-average molecular weight of $7\times10^4$–$20\times10^4$, more preferably $10\times10^4$–$20\times10^4$.

The above-described species of the olefinic rubber may be used alone or in combination.

(b) Polyolefins other than [A]

To improve the elongation and impact strength of the polypropylene resin compositions, polyolefins such as linear low-density polyethylene, low-density polyethylene, ultra low-density polyethylene, etc. may preferably be added. The polyolefin may be added alone or together with the olefinic rubber. When both olefinic rubber and polyolefin are added, a weight ration of olefinic rubber/polyolefin is preferably 1:10–10:1.

The preferred linear low-density polyethylene is a linear copolymer of ethylene and α-olefin having 4–8 carbon atoms. The α-olefin may be 4-methyl-1-pentene, 1-butene, 1-hexene, etc. The ethylene content in the linear low-density polyethylene is preferably 90 mol % or more, more preferably 95 mol % or more. Such linear low-density polyethylene has a density of 0.910–0.940 g/cm$^3$, preferably 0.910–0.930 g/cm$^3$ and a melt index (MI, 190° C., 2.16 kg load) of 0.7–60 g/10 minutes, more preferably 3–20 g/10 minutes.

[C] Inorganic filler

The inorganic fillers are generally used as reinforcing fillers for resins, etc. The inorganic fillers are, for instance, talc, mica, short glass fibers, fibrous crystalline calcium silicate, calcium carbonate, etc. Among them, talc and short glass fibers are preferable.

The inorganic fillers preferably have an average diameter of 15 μm or less. In the case of needle-shaped or fibrous inorganic filler, their diameters are preferably 1–100 μm, and their aspect ratios are preferably 3–30.

[D] Other additives

The polypropylene resin composition of the present invention may further contain various other additives such as heat stabilizers, weathering agents, antioxidants, photo-stabilizers, flame retardants, plasticizers, antistatic agents, nucleating agents, parting agents, foaming agents, pigments, etc.

[2] Proportions of components

The proportions of the above components [A], [B] and [C] are such that the component [A] (polypropylene resin comprising stereoblock polypropylene and/or ultra-high stereospecific polypropylene) is 50–90 parts by weight, preferably 60–80 parts by weight, that the component [B] (olefinic rubber and/or polyolefin other than [A]) is 50–10 parts by weight, preferably 40–20 parts by weight, and that the component [C] (inorganic filler) is 0–40 parts by weight, preferably 0–10 parts by weight per 100 parts by weight of [A]+[B].

If the amount of the polypropylene resin is less than 50 parts by weight, the resulting polypropylene resin composition would fail to show improved flexural modulus and hardness. On the other hand, if the amount of the polypropylene resin is larger than 90 parts by weight, the resulting polypropylene resin composition would fail to show improved impact strength. In the %, polypropylene resin containing the SBPP, the SBPP is 3–30 weight preferably 5–10 weight % in the polypropylene resin. In this case, the other part of the polypropylene resin may be conventional polypropylene which is not categorized into the SBPP or the ultra-high stereospecific polypropylene.

When the ultra-high stereospecific polypropylene is contained in the polypropylene resin together with the SBPP, the amount of ultra-high stereospecific polypropylene is 70–97 weight % while the amount of the SBPP is 3–30 weight %. If the amount of the SBPP is less than 3 weight % (the amount of the ultra-high stereospecific polypropylene is larger than 97 weight %), the resulting polypropylene resin composition would fail to show improved impact strength. On the other hand, if the amount of the SBPP is more than 30 weight % (the amount of the ultra-high stereospecific polypropylene is less than 70 weight %), the resulting polypropylene resin composition would fail to show improved stiffness. The preferred amount of SBPP is 5–10 weight %, and the preferred amount of the ultra-high stereospecific polypropylene is 90–95 weight %.

If the amount of the olefinic rubber and/or polyolefin other than [A] is less than 10 parts by weight, the resulting polypropylene resin composition would fail to show improved tensile rupture elongation and impact strength. On the other hand, if the amount of the olefinic rubber and/or polyolefin other than [A] is larger than 50 parts by weight, the resulting polypropylene resin composition would fail to show improved mechanical strength such as flexural modulus.

If the amount of the inorganic filler is larger than 40 parts by weight per 100 parts by weight of [A]+[B], the resulting polypropylene resin composition would fail to show improved impact strength and tensile elongation. The preferred amount of the inorganic filler is 0–10 parts by weight.

[3] Production of polypropylene resin composition

The above components [A], [B] and [C] are melt-blended in an extruder such as a single-screw extruder or a double-screw extruder at 190°–250° C., preferably 200°–230° C.

The present invention will be explained in further detail by way of the following Examples without intention of restricting the scope of the present invention.

Reference Example 1

Production of SBPP

Preparation of Catalyst component (i)

8.3 g of metallic magnesium chip (purity: 99.5%, average diameter: 1.6 mm) and 250 ml of n-hexane were introduced into a one-liter reactor equipped with a reflux condenser in a nitrogen atmosphere. After one-hour stirring at 68° C., the metallic magnesium was taken out, and vacuum drying was conducted at 65° C. to recover a pre-activated metallic magnesium.

The pre-activated metallic magnesium was then mixed with 140 ml of n-butyl ether and 0.5 ml of a solution of n-butyl magnesium chloride in n-butyl ether (1.75 mole/liter) to prepare a suspension, which was kept at 55° C. Further, a solution of 38.5 ml of n-butyl chloride in 50 ml of n-butyl ether was dropped to the suspension over 50 minutes. After reaction at 70° C. for 4 hours under stirring, the resultant reaction solution was kept at 25° C.

Next, 55.7 ml of $HC(OC_2H_5)_3$ was dropped to this reaction solution over one hour. After dropping, reaction was conducted at 60° C. for 15 minutes, and the resultant solid reaction product was washed with each 300 ml of n-hexane 6 times, vacuum-dried at room temperature for 1 hour to recover 31.6 g of a solid catalyst containing 19.0% of magnesium and 28.9% of chlorine.

6.3 g of the magnesium-containing solid catalyst and 50 ml of n-heptane were introduced into a 300-ml reactor equipped with a reflux condenser, a stirrer and a dropping funnel in a nitrogen atmosphere to form a suspension. While stirring at room temperature, a mixture of 20 ml (0.02 millimole) of 2,2,2-trichloroethanol and 11 ml of n-heptane was dropped into the suspension through the dropping funnel over 30 minutes and further stirred at 80° C. for 1 hour. The resultant solid component was filtered out, and washed with each 100 ml of n-hexane 4 times and then with each 100 ml of toluene 2 times at room temperature.

The above solid component was mixed with 40 ml of toluene and titanium tetrachloride in an amount such that a volume ratio of titanium tetrachloride/toluene was 3/2, and heated to 90° C. After dropping a mixture of 2 ml of di-n-butyl phthalate and 5 ml of toluene under stirring, the resultant mixture was stirred at 120° C. for 2 hours. The resultant solid material was filtered out at 90° C. and washed with each 100 ml of toluene 2 times at 90° C. Titanium tetrachloride was further added to the solid material in an amount such that a volume ratio of titanium tetrachloride/ toluene was 3/2, and stirred at 120° C. for 2 hours. Washing was conducted with each 100 ml of n-hexane 7 times at room temperature to recover 5.5 g of a catalyst component (i).

Polymerization 120 ml of a solution of triisobutyl aluminum (TIBAL) in n-heptane (0.2 mole/liter) was mixed with 120 ml of a solution of t-butyl-t-butoxy-di-n-propoxy silane in n-heptane (0.04 mole/liter) and kept for 5 minutes. The resultant mixture was introduced into a 100-liter stainless steel autoclave equipped with a stirrer in a nitrogen atmosphere. After charging 36 liters of a hydrogen gas and 60 liters of liquid propylene as molecular weight modifiers into the autoclave, the reaction mixture was heated to 80° C. 600 mg of the above catalyst component (i) was introduced into the reaction mixture to carry out the polymerization of propylene for 1 hour. After the completion of polymerization, unreacted propylene was purged out to obtain 14.2 kg of white polypropylene powder. The yield (CE) of polypropylene per 1 g of the catalyst component (i) was 23.7 kg.

200 g of the polypropylene powder was charged into a cylindrical filter paper to carry out extraction with hot heptane for 5 hours by a Soxhlet extractor, thereby removing a hot heptane-insoluble component. The hot heptane-insoluble component remaining in the cylindrical filter paper was further extracted with hot octane for 10 hours to recover a hot octane-soluble component, from which octane was removed by an evaporator to obtain 97.0 g of a hot heptane-insoluble, hot octane-soluble stereoblock polypropylene (SBPP). The yield (CEsb) of SBPP per 1 g of the catalyst component (i) was 11.5 kg. [mmmm] and [rrrr] of the SBPP measured by $^{13}$C-NMR were 75.0% and 5.4%, respectively, and the weight-average molecular weight Mw of the SBPP measured by GPC was $1.50 \times 10^5$.

After the SBPP was blended with 0.1% of BHT at 170° C. for 3 minutes in a nitrogen atmosphere, differential thermal analysis was conducted by a differential scanning calorimeter (DSC) at a scanning speed of 10° C./minute to observe endothermic peaks at 119° C. and 162° C., respectively. These peaks correspond to the crystal melting of syndiotactic chains and isotactic chains, respectively, as reported in Macromol. Chem., 193, 1765 (1992). By combining the data of these peaks with those of $^{13}$C-NMR, it has been confirmed that this polypropylene had a stereoblock structure.

Reference Example 2

Production of ultra-high stereospecific polypropylene (HSPP-1)

Preparation of catalyst component (i)

8.3 g of metallic magnesium chip (purity: 99.5%, average diameter: 1.6 mm) and 250 ml of n-hexane were introduced into a one-liter reactor equipped with a reflux condenser in a nitrogen atmosphere. After one-hour stirring at 68° C., the metallic magnesium was taken out, and vacuum drying was conducted at 65° C. to recover a pre-activated metallic magnesium.

The pre-activated metallic magnesium was then mixed with 140 ml of n-butyl ether and 0.5 ml of a solution of n-butyl magnesium chloride in n-butyl ether (1.75 mole/ liter) to prepare a suspension, which was kept at 55° C. Further, a solution of 38.5 ml of n-butyl chloride in 50 ml of n-butyl ether was dropped to the suspension over 50 minutes. After reaction at 70° C. for 4 hours under stirring, the resultant reaction solution was kept at 25° C.

Next, 55.7 ml of $HC(OC_2H_5)_3$ was dropped to this reaction solution over one hour. After dropping, reaction was conducted at 60° C. for 15 minutes, and the resultant solid reaction product was washed with each 300 ml of n-hexane 6 times, vacuum-dried at room temperature for 1 hour to recover 31.6 g of a solid catalyst containing 19.0% of magnesium and 28.9% of chlorine.

6.3 g of the magnesium-containing solid catalyst and 50 ml of n-heptane were introduced into a 300-ml reactor equipped with a reflux condenser, a stirrer and a dropping funnel in a nitrogen atmosphere to form a suspension. While stirring at room temperature, a mixture of 20 ml (0.02 millimole) of 2,2,2-trichloroethanol and 11 ml of n-heptane was dropped into the suspension through the dropping funnel over 30 minutes and further stirred at 80° C. for 1 hour. The resultant solid component was filtered out, and washed with each 100 ml of n-hexane 4 times and then with each 100 ml of toluene 2 times at room temperature.

The above solid component was mixed with 40 ml of toluene and titanium tetrachloride in an amount such that a volume ratio of titanium tetrachloride/toluene was 3/2, and heated to 90° C. After dropping a mixture of 2 ml of di-n-butyl phthalate and 5 ml of toluene under stirring, the resultant mixture was stirred at 120° C. for 2 hours. The resultant solid material was filtered out at 90° C. and washed with each 100 ml of toluene 2 times at 90° C. Titanium tetrachloride was further added to the solid material in an amount such that a volume ratio of titanium tetrachloride/ toluene was 3/2, and stirred at 120° C. for 2 hours. Washing was conducted with each 100 ml of n-hexane 7 times at room temperature to recover 5.5 g of a catalyst component (i).

Pre-polymerization 3.5 g of the above catalyst component (i) and 300 ml of n-heptane were introduced into a 500-ml reactor equipped with a stirrer in a nitrogen atmosphere, and cooled to −5° C. while stirring. Further introduced into the reactor were a solution of triethyl aluminum (TEAL) in n-heptane (2.0 mole/liter), and cyclohexyl-isopropoxy dimethoxy silane in such amounts that the concentrations of TEAL and cyclohexyl-isopropoxy dimethoxy silane in the reaction system were 60 millimole/liter and 10 millimole/liter, respectively. The reaction system was stirred for 5 minutes.

After evacuation, a propylene gas was continuously introduced into the reaction system to carry out polymerization for 4 hours. After the completion of polymerization, a gaseous propylene was purged out, and the resultant solid phase was washed with each 100 ml of n-hexane three times at room temperature. Further, the solid product was dried at room temperature under reduced pressure for 1 hour to obtain a solid catalyst (i). As a result of measuring the amount of magnesium contained in the solid catalyst (i), it was found that the pre-polymerized propylene was 1.8 g per 1 g of the catalyst component (i).

Polymerization 120 ml of a solution of TEAL in n-heptane (0.2 mole/liter) was mixed with 120 ml of a solution of isopropyl-t-amyloxy dimethoxy silane in n-heptane (0.04 mole/liter) and kept for 5 minutes. The resultant mixture was introduced into a 100-liter stainless steel autoclave equipped with a stirrer in a nitrogen atmosphere.

After charging 17.0 liters of a hydrogen gas and 60 liters of liquid propylene as molecular weight modifiers into the autoclave, the reaction mixture was heated to 50° C. 600 mg of the above catalyst component (i) was introduced into the reaction mixture to carry out the polymerization of propylene for 1 hour. After the completion of polymerization, unreacted propylene was purged out to obtain 16.2 kg of white polypropylene powder. The yield (CE) of polypropylene per 1 g of the catalyst component (i) was 27.0 kg. The polymerization conditions and results are shown in Tables 1 and 2.

100 g of the polypropylene powder was charged into a cylindrical filter paper to carry out extraction with hot heptane for 5 hours by a Soxhlet extractor, thereby removing a hot heptane-soluble component. As a result, 96.0 g of hot heptane-insoluble polypropylene (HSPP) was obtained at a yield (CEsb) of 25.3 kg per 1 g of the catalyst component (i). This polypropylene had MFR of 150 g/10 minutes. The [mm] and the [mr] of the HSPP measured by $^{13}$C-NMR were 99.6% and 0.3%, respectively, and the average meso chain length Nm calculated therefrom was 665. Incidentally, N' calculated by the equation of N'=250+29.5 log (MFR) was 323.4.

Reference Example 3

Production of ultra-high stereospecific polypropylene (HSPP-2)

The polymerization of propylene was conducted under the same conditions as in Reference Example 1 except for using the catalyst components (ii) and (iii), the amount of a hydrogen gas and the polymerization temperature shown in Table 1.

The yield (CE) of polypropylene per 1 g of the catalyst component (i) was 14.2 kg. The yield (CEhs) of the hot heptane-insoluble polypropylene per 1 g of the catalyst component (i) was 13.6 kg. This polypropylene had MFR of 15.0 g/10 minutes. The [mm] and the [mr] of the HSPP measured by $^{13}$C-NMR were 99.4% and 0.4%, respectively, and the average meso chain length Nm calculated therefrom was 498.0. Incidentally, N' was 281.1.

Reference Examples 4, 5

Production of two types of conventional polypropylene (PP-1, PP-2)

The polymerization of propylene was conducted under the same conditions as in Reference Example 2 except for using the catalyst components (ii) and (iii), the amount of a hydrogen gas and the polymerization temperature shown in Table 1.

The yield (CE) of polypropylene and the yield (CEhs) of a hot heptane-insoluble polypropylene both per 1 g of the catalyst component (i), MFR, [mm] and [mr] determined from the $^{13}$C-NMR spectrum, and the average meso chain length Nm calculated therefrom are shown in Table 2.

TABLE 1

| Ref. Ex. No. | Poly- propylene | Catalyst Comp. (ii) | Catalyst Comp. (iii) | Hy- drogen Gas (liter) | Poly- merization Temp. (°C.) |
| --- | --- | --- | --- | --- | --- |
| 2 | HSPP-1 | TEAL[(1)] | IPADMS[(3)] | 17.0 | 50 |
| 3 | HSPP-2 | TIBAL[(2)] | CHIPDMS[(4)] | 2.5 | 60 |
| 4 | PP-1 | TEAL | CHMDMS[(5)] | 5.5 | 50 |
| 5 | PP-2 | TEAL | CHMDMS | 1.5 | 70 |

Note:
[(1)]Triethyl aluminum.
[(2)]Triisobutyl aluminum.
[(3)]Isopropyl-t-amyloxy dimethoxy silane.
[(4)]Cyclohexyl-isopropoxy dimethoxy silane.
[(5)]Cyclohexylmetyl dimethoxy silane.

TABLE 2

| Ref. Ex. No. | CE[(1)] | CEhs[(1)] | MFR (g/10 min.) | [mm] (%) | [mr] (%) | Nm | N'[(2)] |
| --- | --- | --- | --- | --- | --- | --- | --- |
| 2 | 27.0 | 25.3 | 150 | 99.6 | 0.3 | 665.0 | 323.4 |
| 3 | 14.2 | 13.6 | 15.0 | 99.4 | 0.4 | 498.0 | 281.1 |
| 4 | 15.8 | 14.7 | 150 | 98.2 | 1.1 | 179.5 | 316.7 |
| 5 | 29.0 | 28.3 | 15.0 | 98.0 | 1.3 | 151.8 | 267.8 |

Note:
[(1)]Unit: kg − pp/g − cat · hr.
[(2)]Calculated by N' = 250 + 29.5 log (MFR).

EXAMPLES 1–8

1. Starting materials

SBPP:
 Mw=1.50×10$^5$,
 [mmmm]=75.0%, and
 [rrrr]=5.4%.

HSPP-1:
 Ultra-high stereospecific polypropylene prepared in Reference Example 2,
 MFR=150 g/10 minutes (230° C., 2.16 kg load),
 [mm]=99.6%,
 [mr]=0.3%,
 Average meso chain length Nm=665, and
 Flexural modulus =27×10$^3$ kgf/cm$^2$.

HSPP-2:
 Ultra-high stereospecific polypropylene prepared in Reference Example 3,
 MFR=15 g/10 minutes (230° C., 2.16 kg load),
 [mm]=99.4%,
 [mr]=0.4%,
 Average meso chain length Nm=498, and
 Flexural modulus=25×10$^3$ kgf/cm$^2$.

EPR:
 Ethylene-propylene rubber available from Japan Synthetic Rubber Co., Ltd. as "EP02P,"
 Mooney viscosity $M_{1+4}$(100° C.)=24,
 MFR=3.2 g/10 minutes (230° C., 2.16 kg load), and
 Propylene content=26 weight %.

EBR:
 Ethylene-butene rubber available from Japan Synthetic Rubber Co., Ltd. as "EBM2041P,"
 MI=3.5 g/10 minutes (190° C., 2.16 kg load),
 Density=0.88 g/cm$^3$, and
 Butene content=12 weight %.

LLDPE:
Linear low-density polyethylene available from Nippon Unicar Co., Ltd. as "NUCG-5361,"
MI=4.0 g/10 minutes (190° C., 2.16 kg load),
MFR=3.2 g/10 minutes (230° C., 2.16 kg load), and
Density =0.934 g/cm$^3$.

C-1:
Talc available from Fuji Talc K. K. as "LMR-100," and
Average diameter=1.8–2.0 μm.

C-2:
Short glass fibers available from Asahi Fiber Glass K. K. as "MAFT-120,"
Average diameter=13 μm, and
Average length=3 mm.

2. Blending

The above ingredients were dry-blended in proportions shown in Table 3 below by a supermixer and introduced into a double-screw extruder to conduct melt blending at 190°–250° C. and at 200 rpm. The resulting blend was continuously extruded through a die in strand shape, cooled with water and then cut to produce pellets.

3. Forming

The resulting pellets were injection-molded at 210° C. and 600 kgf/cm$^2$ to form specimens.

4. Measurement

The properties of each specimen were measured according to the methods described below.

(1) MFR (g/10 minutes): Measured according to ASTM D1238 at 230° C., 2,160 g.

(2) MI (g/10 minutes): Measured according to ASTM D1238 at 190° C., 2, 160 g.

(3) Tensile elongation (%): Measured according to ASTM D638.

(4) Flexural modulus (×10$^3$ kgf/cm$^2$): Measured according to ASTM D790.

(5) Izod impact strength (kg.cm.cm): Measured on 3.2-mm-thick notched specimen according to ASTM D256.

(6) Thermal deformation temperature (°C.): Measured according to ASTM D648.

(7) Rockwell hardness: Measured according to ASTM D785.

(8) Brittle temperature (°C.): Measured according to ASTM D746.

TABLE 3

| Example No. | 1 | 2 | 3 | 4 |
|---|---|---|---|---|
| Composition (weight %) | | | | |
| SBPP | 5 | 5 | 5 | 5 |
| HSPP-1 | 50 | 50 | 50 | — |
| HSPP-2 | — | — | — | 45 |
| EPR | 35 | 20 | 20 | 20 |
| EBR | — | 15 | — | 10 |
| LLDPE | — | — | 15 | — |
| Talc | 10 | 10 | 10 | 20 |
| Short Glass Fibers | — | — | — | — |
| Properties | | | | |
| MFR | 24 | 25 | 25 | 8 |
| Elongation (%)$^{(1)}$ | >500 | >500 | >500 | >500 |
| Flexural modulus | 19.5 | 20 | 21 | 27.5 |
| Izod$^{(2)}$ at 23° C. | 60 | 61 | 60 | 48 |
| at −30° C. | 10 | 9 | 9 | 6 |
| $T_D$ (°C.)$^{(3)}$ at 4.6 kgf/cm$^2$ | 132 | 135 | 135 | 144 |
| at 18.5 kgf/cm$^2$ | — | — | — | 90 |
| Rockwell Hardness | 67 | 69 | 70 | 90 |
| Brittle Temp. (°C.) | −45 | −43 | −42 | −10 |

TABLE 3-continued

| Example No. | 5 | 6 | 7 | 8 |
|---|---|---|---|---|
| Composition (weight %) | | | | |
| SBPP | 5 | 5 | 5 | 5 |
| HSPP-1 | 65 | — | 75 | 65 |
| HSPP-2 | — | 45 | — | — |
| EPR | 20 | 20 | 10 | — |
| EBR | — | 10 | — | — |
| LLDPE | — | — | 10 | 20 |
| Talc | 10 | — | — | 10 |
| Short Glass Fibers | — | 20 | — | — |
| Properties | | | | |
| MFR | 30 | 5 | 28 | 33 |
| Elongation (%)$^{(1)}$ | >500 | 250 | >500 | 350 |
| Flexural modulus | 29 | 53 | 24 | 31 |
| Izod$^{(2)}$ at 23° C. | 13 | 31 | 40 | 8 |
| at −30° C. | 5 | 5 | 12 | 4 |
| $T_D$ (°C.)$^{(3)}$ at 4.6 kgf/cm$^2$ | 141 | 148 | 115 | 140 |
| at 18.5 kgf/cm$^2$ | 79 | 100 | — | 82 |
| Rockwell Hardness | 94 | 97 | 87 | 95 |
| Brittle Temp. (°C.) | −5 | 5 | −50 | 5 |

Note:
$^{(1)}$Tensile break elongation.
$^{(2)}$Izod impact strength (kg · cm · cm).
$^{(3)}$Thermal deformation temperature.

Comparative Examples 1–2

Pellets were prepared under the same conditions as in Example 1 except for using different compositions shown in Table 4, and the measurement of their properties was carried out in the same manner as in Example 1. The results are shown in Table 4.

TABLE 4

| Comparative Example No. | 1 | 2 |
|---|---|---|
| Composition (weight %) | | |
| SBPP | 5 | 5 |
| HSPP-1 | — | — |
| HSPP-2 | 75 | 30 |
| EPR | — | 55 |
| EBR | — | — |
| LLDPE | — | — |
| Talc | — | 10 |
| Short Glass Fibers | 20 | — |
| Properties | | |
| MFR | 8 | 19 |
| Elongation (%)$^{(1)}$ | >500 | >500 |
| Flexural modulus | 55.5 | 11 |
| Izod$^{(2)}$ at 23° C. | 17 | 60 |
| at −30° C. | 8 | 36 |
| $T_D$ (°C.)$^{(3)}$ at 4.6 kgf/cm$^2$ | — | >80 |
| at 18.5 kgf/cm$^2$ | 161 | — |
| Rockwell Hardness | 114 | 33 |
| Brittle Temp. (°C.) | — | −60 |

Note:
$^{(1)-(3)}$The same as under Table 3.

EXAMPLES 9–14

Pellets were prepared under the same conditions as in Example 1 except for using, in place of the ultra-high stereospecific polypropylene, the below-described conventional polypropylene (prepared in Reference Examples 4 and 5) having substantially the same MFR as that of the ultra-high stereospecific polypropylene, and the measurement of their properties was carried out in the same manner as in Example 1. The results are shown in Table 5.

PP-1:
 MFR=150 g/10 minutes (230° C., 2.16 kg load),
 [mm]=98.2%,
 [mr]=1.1%,
 [mmmm]=94.3%
 [rrrr]=0.3%
 Average meso chain length Nm=315, and
 Flexural modulus=20×10³ kgf/cm².

PP-2:
 MFR=15 g/10 minutes (230° C., 2.16 kg load),
 [mm]=98.0%,
 [mr]=1.3%,
 [mmmm]=94.2%
 [rrrr]=0.3%
 Average meso chain length Nm=265, and
 Flexural modulus=19×10³ kgf/cm².

TABLE 5

| Example No. | 9 | 10 | 11 | 12 | 13 | 14 |
|---|---|---|---|---|---|---|
| Composition (weight %) | | | | | | |
| SBPP | 5 | 5 | 5 | 5 | 5 | 5 |
| PP-1 | 50 | 50 | 50 | — | 65 | — |
| PP-2 | — | — | — | 45 | — | 45 |
| EPR | 35 | 20 | 20 | 20 | 20 | 20 |
| EBR | — | 15 | — | 10 | — | 10 |
| LLDPE | — | — | 15 | — | — | — |
| Talc | 10 | 10 | 10 | 20 | 10 | — |
| Short Glass Fibers | — | — | — | — | — | 20 |
| Properties | | | | | | |
| MFR | 24 | 25 | 25 | 8 | 30 | 6 |
| Elongation (%)[1] | >500 | >500 | >500 | >500 | >500 | 300 |
| Flexural modulus | 16 | 16.2 | 16.8 | 24 | 24.5 | 45 |
| Izod[2] | | | | | | |
| at 23° C. | 61 | 62 | 60 | 47 | 13 | 36 |
| at −30° C. | 10 | 9 | 9 | 6 | 5 | 4 |
| $T_D$ (°C.)[3] | | | | | | |
| at 4.6 kgf/cm² | 120 | 120 | 121 | 119 | 128 | 140 |
| at 18.5 kgf/cm² | — | — | — | 80 | 77 | 95 |
| Rockwell Hardness | 58 | 60 | 61 | 80 | 89 | 95 |
| Brittle Temp. (°C.) | −45 | −43 | −42 | −10 | −5 | 0 |

Note:
[1]–[3]The same as under Table 3.

Comparative Example 3

Pellets were prepared under the same conditions as Example 1 except for using PP-2 in place of the ultra-high stereospecific polypropylene, and the measurement of their properties was carried out in the same manner as in Example 1. The results are shown in Table 6.

TABLE 6

| Com. Ex. No. | 3 |
|---|---|
| Composition (weight %) | |
| SBPP | 5 |
| PP-2 | 75 |
| EPR | — |
| EBR | — |
| LLDPE | — |
| Short Glass Fibers | 20 |
| Properties | |
| MFR | 8 |
| Elongation (%)[1] | >500 |
| Flexural modulus | 51 |
| Izod[2] at 23° C. | 17 |
| at −30° C. | 8 |
| $T_D$ (°C.)[3] at 4.6 kgf/cm² | — |
| at 18.5 kgf/cm² | 154 |
| Rockwell Hardness | 108 |
| Brittle Temp. (°C.) | — |

Note:
[1]–[3]The same as under Table 3.

EXAMPLES 15–22

Polypropylene resin compositions containing no SBPP were produced under the same conditions as in Example 1, and the measurement of their properties was carried out in the same manner as in Example 1. The results are shown in Table 7.

TABLE 7

| Example No. | 15 | 16 | 17 | 18 |
|---|---|---|---|---|
| Composition (weight %) | | | | |
| HSPP-1 | 55 | 55 | 55 | — |
| HSPP-2 | — | — | — | 50 |
| EPR | 35 | 20 | 20 | 20 |
| EBR | — | 15 | — | 10 |
| LLDPE | — | — | 15 | — |
| Talc | 10 | 10 | 10 | 20 |
| Short Glass Fibers | — | — | — | — |
| Properties | | | | |
| MFR | 24 | 25 | 25 | 8 |
| Elongation (%)[1] | 400 | >500 | 450 | >500 |
| Flexural modulus | 20 | 20.5 | 21 | 28 |
| Izod[2] at 23° C. | 42 | 40 | 40 | 30 |
| at −30° C. | 9 | 8 | 8 | 4 |
| $T_D$ (°C.)[3] at 4.6 kgf/cm² | 133 | 135 | 136 | 145 |
| at 18.5 kgf/cm² | 78 | 78 | 79 | 90 |
| Rockwell Hardness | 68 | 70 | 70 | 90 |
| Brittle Temp. (°C.) | −42 | −40 | −40 | 0 |

| Example No. | 19 | 20 | 21 | 22 |
|---|---|---|---|---|
| Composition (weight %) | | | | |
| HSPP-1 | 70 | — | 80 | 70 |
| HSPP-2 | — | 50 | — | — |
| EPR | 20 | 20 | 10 | — |
| EBR | — | 10 | — | — |
| LLDPE | — | — | 10 | 20 |
| Talc | 10 | — | — | 10 |
| Short Glass Fibers | — | 20 | — | — |
| Properties | | | | |
| MFR | 30 | 6 | 30 | 35 |
| Elongation (%)[1] | 200 | 150 | >500 | 200 |
| Flexural modulus | 30 | 55 | 25 | 33 |
| Izod[2] at 23° C. | 7 | 25 | 35 | 6 |
| at −30° C. | 3 | 4 | 10 | 3 |
| $T_D$ (°C.)[3] at 4.6 kgf/cm² | 140 | 150 | 110 | 143 |
| at 18.5 kgf/cm² | 80 | 103 | — | 85 |
| Rockwell Hardness | 95 | 100 | 90 | 98 |
| Brittle Temp. (°C.) | 10 | 15 | −40 | 12 |

Note:
[1]–[3]The same as under Table 3.

Comparative Examples 4, 5

Polypropylene resin compositions containing no SBPP were produced under the same conditions as in Example 1, and the measurement of their properties was carried out in the same manner as in Example 1. The results are shown in Table 8.

TABLE 8

| Comparative Example No. | 4 | 5 |
|---|---|---|
| Composition (weight %) | | |
| HSPP-1 | — | 35 |
| HSPP-2 | 80 | — |
| EPR | — | 55 |
| EBR | — | — |
| LLDPE | — | — |
| Talc | — | 10 |
| Short Glass Fibers | 20 | — |
| Properties | | |
| MFR | 10 | 21 |
| Elongation (%)[(1)] | 3 | >500 |
| Flexural modulus | 65 | 13 |
| Izod[(2)] at 23° C. | 5 | 53 |
| at −30° C. | 3 | 35 |
| $T_D$ (°C.)[(3)] at 4.6 kgf/cm² | —[(4)] | <80 |
| at 18.5 kgf/cm² | 140 | —[(5)] |
| Rockwell Hardness | 120 | 35 |
| Brittle Temp. (°C.) | >RT[(6)] | −53 |

Note:
[(1)]–[(3)]The same as under Table 3.
[(4)]Not measured because the deformation was too large.
[(5)]Not measured because the thermal deformation temperature was too low.
[(6)]Higher than room temperature.

Comparative Examples 6–11

Polypropylene resin compositions containing conventional polypropylene in place of SBPP and HSPP were produced under the same conditions as in Example 1, and the measurement of their properties was carried out in the same manner as in Example 1. The results are shown in Table 9.

TABLE 9

| Com. Ex. No. | 6 | 7 | 8 | 9 | 10 | 11 |
|---|---|---|---|---|---|---|
| Composition (weight %) | | | | | | |
| PP-1 | 55 | 55 | 55 | — | 70 | — |
| PP-2 | — | — | — | 50 | — | 80 |
| EPR | 35 | 20 | 20 | 20 | 20 | — |
| EBR | — | 15 | — | 10 | — | — |
| LLDPE | — | — | 15 | — | — | — |
| Talc | 10 | 10 | 10 | 20 | 10 | — |
| Short Glass Fibers | — | — | — | — | — | 20 |
| Properties | | | | | | |
| MFR | 24 | 25 | 25 | 8 | 30 | 8 |
| Elongation (%)[(1)] | 400 | >500 | 450 | >500 | 200 | 4 |
| Flexural modulus | 16 | 16.5 | 17 | 24 | 25 | 51 |
| Izod[(2)] at 23° C. | 43 | 40 | 40 | 31 | 7 | 7 |
| at −30° C. | 9 | 8 | 8 | 4 | 3 | 6 |
| $T_D$ (°C.)[(3)] | | | | | | |
| at 4.6 kgf/cm² | 121 | 122 | 122 | 120 | 130 | — |
| at 18.5 kgf/cm² | — | — | — | 81 | 79 | 155 |
| Rockwell | 60 | 61 | 62 | 82 | 90 | 110 |
| Hardness | | | | | | |
| Brittle Temp. (°C.) | −43 | −40 | −40 | 0 | 10 | — |

Note:
[(1)]–[(3)]The same as under Table 3.

As is clear from the above results, the polypropylene resin compositions of the present invention have well balanced elongation, impact strength, stiffness and heat resistance, while those of Comparative Examples are poor in at least one of such properties.

As described above in detail, since the polypropylene resin compositions of the present invention have well balanced impact strength, stiffness and heat resistance, which are in antinomic relation in the conventional polypropylene resin composition, they are useful in various applications.

What is claimed is:

1. A polypropylene resin composition comprising;
    (A) 50–90 parts by weight of a resin mixture of 3–30 weight % of a polypropylene insoluble in hot heptane and soluble in hot octane and 70–97 weight of an ultra-high stereospecific polypropylene, said ultra-high stereospecific polypropylene having a melt flow rate (MFR, 230° C., 2.16 kg load) of 0.1–1,000 g/10 minutes in which an average meso chain length Nm calculated from a triad percentage determined from $^{13}$C-NMR spectrum by the following formula (1)

$$Nm = 2[mm]/[mr] + 1 \quad (1),$$

wherein
[mm] is (isotactic triad/total triad)×100 (%), and [mr] is (heterotactic triad/total triad)×100 (%), meets a relation expressed by the following formula (2)

$$Nm > 250 + 29.5 \log (MFR) \quad (2),$$

and said polypropylene insoluble in hot heptane and soluble in hot octane having a weight-average molecular weight of 5,000–1,000,000, a percentage of five continuous propylene monomer units in which all propylene bonds are meso bonds and a percentage of five continuous propylene monomer units in which all propylene bonds are racemic bonds, both determined from pentad percentages in $^{13}$C-NMR spectrum, being 70% or more and 5% or more, respectively, relative to the all propylene bonds, and
    (B) 50–10 parts by weight of an olefinic rubber and/or a polyolefin other than said (A).

2. The polypropylene resin composition according to claim 1, further containing (C) 0–40 parts by weight of an inorganic filler per 100 parts by weight of said (A)+said (B).

3. The polypropylene resin composition according to claim 1, or 2, wherein said polyolefin other than said (A) is linear low-density polyethylene.

* * * * *